United States Patent
Kutomi et al.

(10) Patent No.: US 6,988,768 B2
(45) Date of Patent: Jan. 24, 2006

(54) VEHICLE SEAT APPARATUS

(75) Inventors: Shingo Kutomi, Nishikamo-gun (JP); Takashi Ogino, Okazaki (JP); Takao Tsutsui, Akishima (JP); Yoshihiro Mizushima, Akishima (JP)

(73) Assignees: Mitsubishi Jidosha Kogyo Kabushiki Kaisha, (JP); Tachi-S Co., Ltd., (JP)

( * ) Notice: Subject to any disclaimer, the term of this patent is extended or adjusted under 35 U.S.C. 154(b) by 0 days.

(21) Appl. No.: 10/403,540

(22) Filed: Mar. 31, 2003

(65) Prior Publication Data

US 2003/0184130 A1    Oct. 2, 2003

(30) Foreign Application Priority Data

Mar. 29, 2002    (JP)    ............................. 2002-097055

(51) Int. Cl.
*B60N 2/36*    (2006.01)
(52) U.S. Cl. ..................................... 297/15; 296/65.09
(58) Field of Classification Search .................. 297/15; 296/65.05, 65.09
See application file for complete search history.

(56) References Cited

U.S. PATENT DOCUMENTS

| 4,971,395 A | * | 11/1990 | Coussemacq et al. | .... 297/378.1 |
| 5,269,581 A | * | 12/1993 | Odagaki et al. | ............... 296/66 |
| 5,868,451 A | * | 2/1999 | Uno et al. | ..................... 296/66 |
| 5,890,758 A | * | 4/1999 | Pone et al. | .................... 297/15 |
| 5,927,808 A | * | 7/1999 | Esker | .......................... 297/333 |
| 5,975,612 A | * | 11/1999 | Macey et al. | .................. 296/66 |
| 6,179,362 B1 | * | 1/2001 | Wisniewski et al. | ...... 296/65.01 |
| 6,231,101 B1 | * | 5/2001 | Kamida et al. | ............... 296/63 |
| 6,318,784 B2 | * | 11/2001 | Nishide | .................... 296/65.09 |
| 6,394,525 B1 | * | 5/2002 | Seibold | .................... 296/65.09 |
| 6,435,589 B2 | * | 8/2002 | Shimizu et al. | .......... 296/65.09 |
| 6,682,120 B2 | * | 1/2004 | Kamida et al. | .......... 296/65.09 |
| 2003/0193206 A1 | * | 10/2003 | Kutomi et al. | ................. 296/66 |

FOREIGN PATENT DOCUMENTS

| DE | 100 59 335 A1 | 11/2000 |
| EP | 0 990 551 A1 | 4/2000 |
| JP | 2001301504 A | 10/2001 |
| JP | 2003212017 A | * 7/2003 |
| WO | WO 02/14104 A1 | 2/2002 |

* cited by examiner

*Primary Examiner*—Peter M. Cuomo
*Assistant Examiner*—Stephen D'Adamo
(74) *Attorney, Agent, or Firm*—Rossi, Kimms & McDowell, LLP

(57) ABSTRACT

A vehicle seat apparatus in which a seat is rotated around a rotational shaft to the rear of a vehicle in such a manner that a bottom surface of a seat cushion is made to face the inside of a passenger compartment so that the seat can be stowed in a recessed portion. The rotational shaft extends in a transverse direction along a front edge of the recessed portion to be fixed to a vehicle body at ends thereof. A seat cushion and a seat back of the seat are both divided into at least two in a widthwise direction. Respective seats so divided are rotatably supported on the rotational shaft individually.

12 Claims, 3 Drawing Sheets

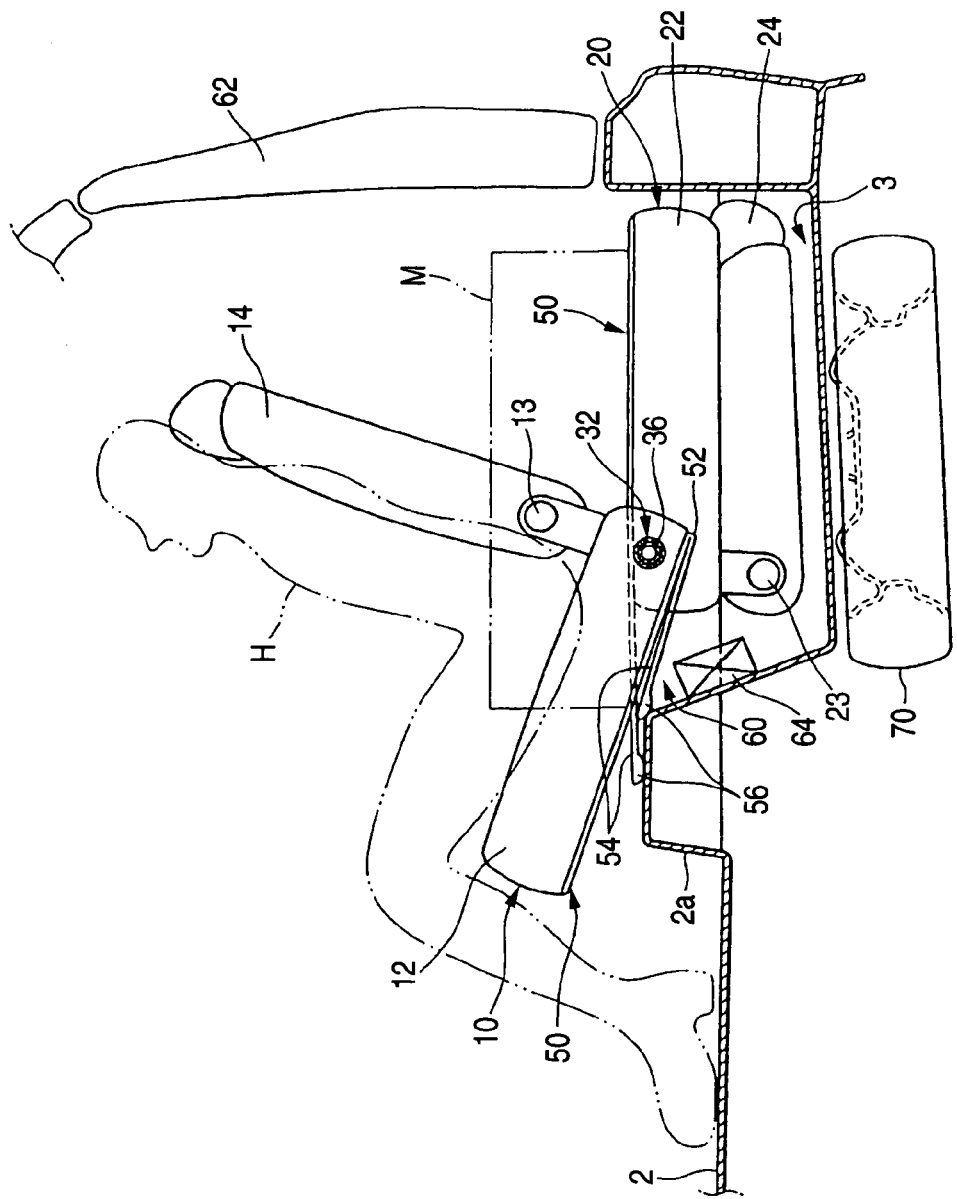

VEHICLE SEAT APPARATUS

BACKGROUND OF THE INVENTION

1. Field of the Invention

The present invention relates to a vehicle seat apparatus, and more particularly to a seat structure in which a seat can be rotated to be stowed.

2. Description of the Related Art

In recent years, constructions have been getting common on vehicles of station wagon and van types in which a third-row seat is provided in a space behind a second-row seat in the passenger compartment.

However, the third-row seat so provided occupies a luggage space. Thus there is caused a problem that when a piece of large-sized luggage or a number of pieces of luggage are attempted to be loaded in the vehicle in addition to passengers, the luggage cannot be loaded as desired.

To cope with this problem, a seat stowing structure is disclosed in, for example, Japanese Utility Model Registration No. 2594404 in which a recessed stowage portion is provided in the surface of a floor of a vehicle at a position behind a third-row seat so that the third-row seat can be folded and rotated backward to thereby be stowed in the recessed stowage portion.

With the structure disclosed in the Japanese registered utility model publication, however, since the third-row seat is an integral or one-piece seat, no passenger can be seated at a position where the third-row seat is provided when the seat is stowed in the recessed stowage portion. On the other hand, when the seat is not stowed and is used as it is designed, the conventional problem that a relatively large piece luggage cannot be loaded as desired still remains.

Namely, with the structure disclosed in the publication, the space at the rear of the passenger compartment of the vehicle cannot be shared by a passenger and luggage, and hence the structure is found to be inconvenient and impractical.

SUMMARY OF THE INVENTION

The invention has been made to solve the above problems, and an object the invention is to provide a vehicle seat apparatus which can allow space at the rear of the passenger compartment of the vehicle to be shared by a passenger and luggage.

With a view to attaining the object, according to a first aspect of the invention, there is provided a vehicle seat apparatus comprising: a seat disposed on a surface of a floor and including a seat cushion and a seat back; a rotational shaft; and a recessed portion formed in the surface of the floor at a position rearward of the seat, wherein the seat is rotated around the rotational shaft towards the rear of a vehicle so that a bottom surface of the seat faces the inside of a passenger compartment to thereby be stowed in the recessed portion, the seat cushion and the seat back are both divided into at least two in a widthwise direction to form divided seats, and the divided seats are each rotatably supported on the rotational shaft Consequently, the seat is divided into at least two, and the seats so divided are allowed to rotate around the rotational shaft independently from each other, whereby the divided seats can be stowed in the recessed portion individually. Due to this, for example, while a passenger can be seated on one of the divided seats, the other or remaining divided seat is rotated backward to thereby be stowed in the recessed portion so that luggage can be loaded on the bottom surface of the seat cushion, whereby the space at the rear of the passenger compartment can be shared for use by the passenger and luggage conveniently.

BRIEF DESCRIPTION OF THE DRAWINGS

FIG. 4 is a sectional view taken along the line A—A in FIG. 1, or a view showing the third-row seat unit as viewed from the left-hand side.

DETAILED DESCRIPTION OF THE PREFFERED EMBODIMENTS

One embodiment of a vehicle seat apparatus according to the invention will be described below with reference to the accompanying drawings.

Figure 1:
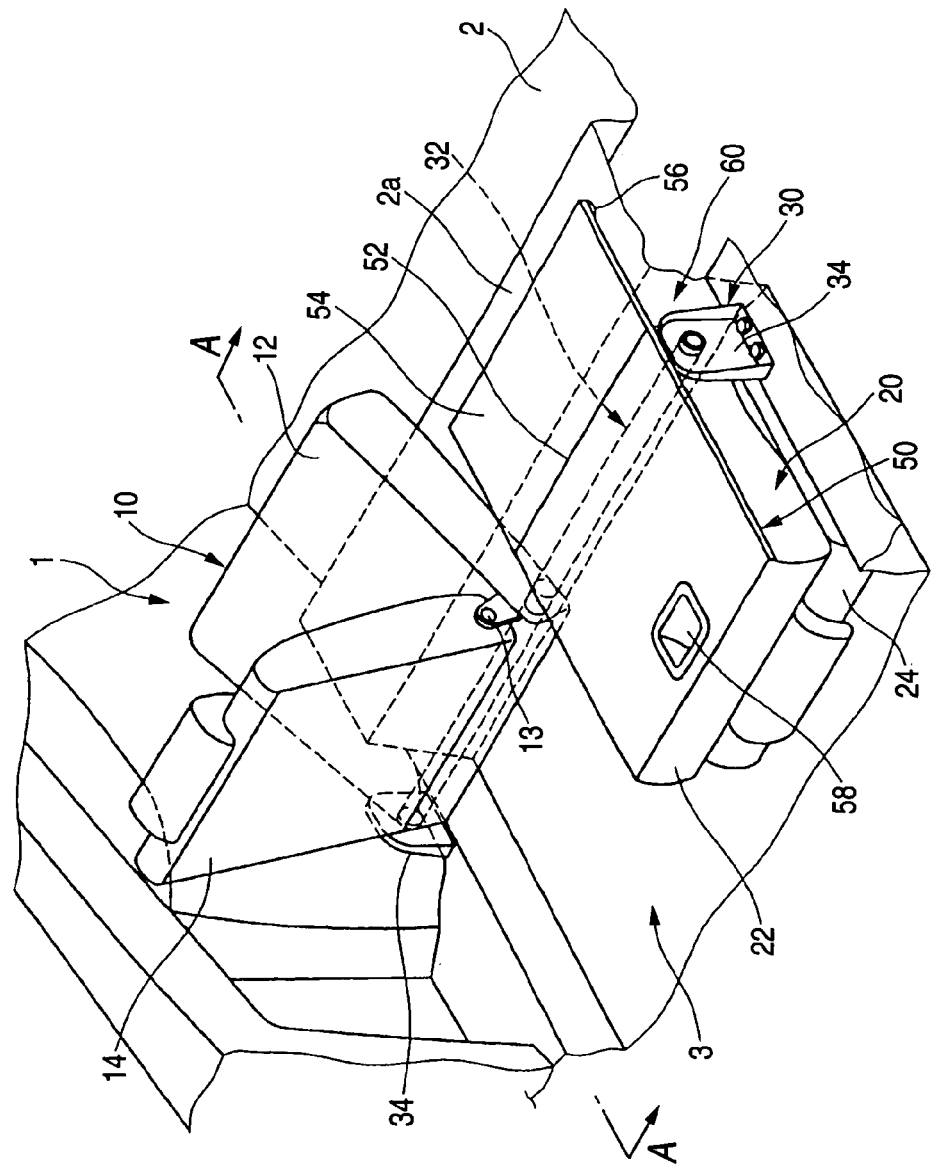
FIG. 1 is a perspective view of a third-row seat unit provided rearward of a second-row seat at a rearmost portion inside a passenger compartment of a station wagon- or van-type vehicle, as viewed from the rear in a diagonal direction.

Referring to FIG. 1, a perspective view of a third-row seat unit 1 as viewed from the rear in a diagonal direction is shown. The third-row seat unit 1 is shown as being provided in a passenger compartment of a vehicle of station wagon or van type at a position rearward of a second-row seat or at a rearmost portion of the passenger compartment.

As shown in the figure, the third-row seat unit 1 is divided transversely to have two seats or a seat 10 and a seat 20. The seats 10, 20 each include a seat cushion 12, 22 and a seat back 14, 24. To be specific, the seats 10, 20 are each constructed such that the seat cushion 12, 22 and the seat back 14, 24 can be folded around a fulcrum 13, 23. The seat unit 1, namely, the seat 10 and the seat 20 are disposed on an upper surface of a floor panel 2 via a rotational shaft unit 30.

The rotational shaft unit 30 includes a rotational shaft 32 and a pair of support brackets 34, 34. The rotational shaft 32 extends through sides of the seat cushions 12, 22 at a rear portion thereof, whereby the divided seats 10, 20 are both rotatably supported on the rotational shaft 32.

In addition, as shown in the figure, a raised portion 2a is formed in the floor panel 2 in such a manner as to be situated underneath the seat cushions 12, 22 and to extend in the transverse direction. A recessed portion 3 having an opening area which is slightly larger than the dimensions of an outer circumferential configuration of the seat unit 1 is formed behind the seat unit 1 in such a manner as to continuously extend rearward from the raised portion 2a so that the seats 10, 20 can be stowed in the recessed portion 3 in a folded state. The seat unit 1 is placed on the upper surface of the floor panel 2 in the vicinity of a front edge of the recessed portion via the rotational shaft unit 30 in such a manner as to straddle the recessed portion 3. A carpet material is laid entirely over the upper surface of the floor panel 2.

Figure 2:
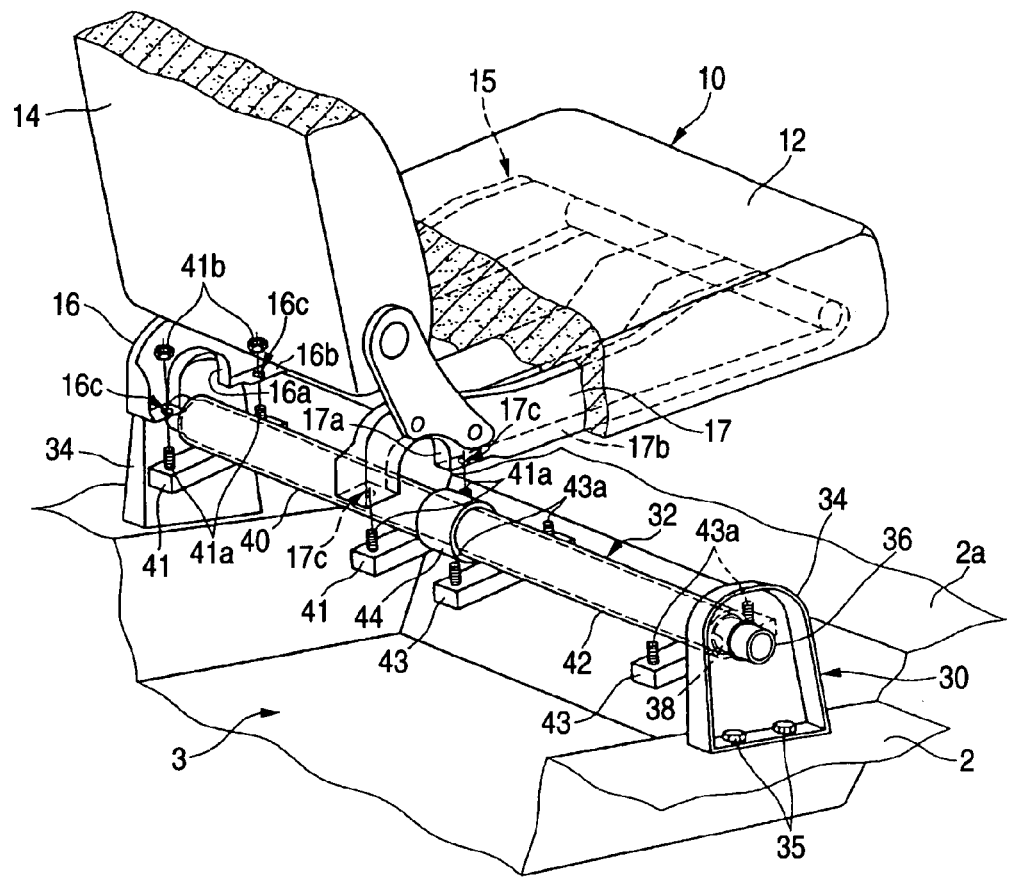
FIG. 2 is a diagram showing in detail a connecting structure of a rotational shaft unit with divided seats.

Referring to FIG. 2, a connecting structure between the rotational shaft unit 30 and the seats 10, 20 is shown in detail, and the connecting structure between the rotational shaft unit 30 and the seats 10, 20 will be described below based on the same figure. Note that while the description will be given only to the seat 10 here, the same is also true with the seat 20.

Figure 3:
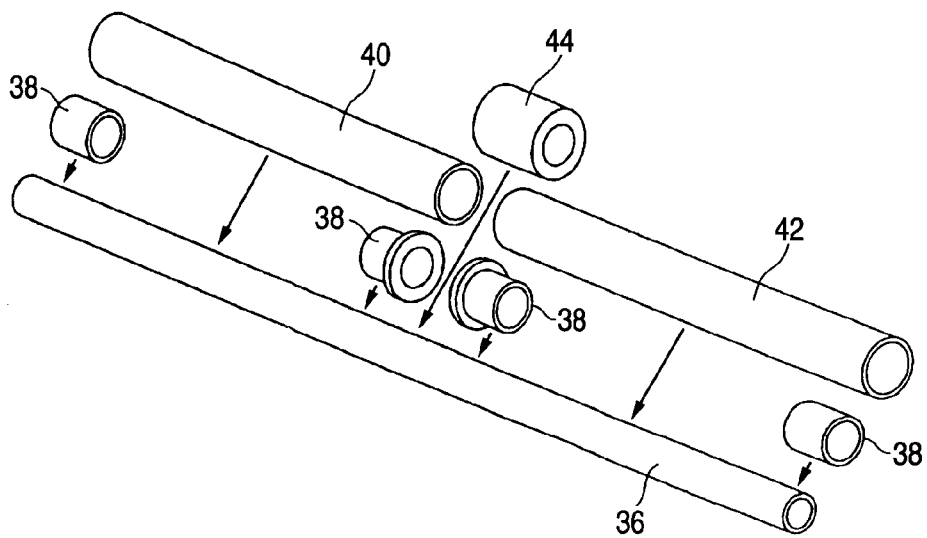
FIG. 3 is a diagram showing a structure of a rotational shaft.

As has been described above, the rotational shaft unit 30 includes the rotational shaft 32 and the pair of support brackets 34, 34, as shown in FIGS. 2 and 3. In the rotational shaft unit 30, a fixed shaft (a first shaft, for example, a thick steel pipe) 36 of the rotational shaft 32 is fixed to the support brackets 34, 34 by means of welding, and a hollow shaft (a second shaft, for example, a steel pipe) 40 corresponding to the seat 10 and a hollow shaft (a second shaft, for example, a steel pipe) 42 corresponding to the seat 20 are each fitted rotatably on the fixed shaft 36 via sleeves 38. Furthermore, a spacer 44 made up of a hollow pipe is also fitted rotatably on the fixed shaft 36 between the hollow shaft 40 and the hollow shaft 42. Namely, in the rotational shaft unit 30, the hollow shaft 40 corresponding to the seat 10 and the hollow shaft 42 corresponding to the seat 20 are constructed so as to freely rotate around the fixed shaft 36 independently from each other. Note that the fixed shaft 36 and the support brackets 34, 34 have rigidity and strength which are good enough to prevent the deformation of the fixed shaft 36 and the support brackets 34, 34 when passengers are seated on the seats 10, 20.

The sleeves 38 which are shorter than the hollow shafts 40, 42 are interposed between the hollow shafts 40, 42 and the fixed shaft 36, respectively, so as to reduce a contact area between the hollow shafts 40, 42 and the fixed shaft 36, whereby the friction between the hollow shafts 40, 42 and the fixed shaft 36 is reduced, and the rotation of the seats can be facilitated and the wear of the members is suppressed. In addition, the spacer 44 is interposed between the hollow shaft 40 and the hollow shaft 42, whereby even when the respective seats 10, 20 are rotated in opposite directions to each other and the relative rotating speed of the hollow shafts 40, 42 is increased, the direct contact of the both hollow shafts 40, 42 is prevented, whereby the generation of wear is prevented. In addition, the spacer 44 is formed of a material having a relatively low friction coefficient, whereby the seats is allowed to rotate easily.

Seat brackets (second brackets) 41, 41 and seat brackets (second brackets) 43, 43 for fixing the seat 10 and the seat 20, respectively, are joined to the hollow shaft 40 and the hollow shaft 42, respectively, by way of welding etc. A pair of stud bolts 41a, 41a are provided so as to protrude from each of the seat brackets 41, 41 in such a manner as to interpose the hollow shaft 40 therebetween, and a pair of stud bolts 43a, 43a are provided so as to protrude from each of the seat brackets 43, 43 in such a manner as to interpose the hollow shaft 42 therebetween.

The support brackets 34, 34 are fastened to the floor panel 2 by means of bolts 35, whereby the rotational shaft unit 30 is fixed to the upper surface of the floor panel 2 in such a manner as to straddle the recessed portion 3.

A cushion frame 15 is provided in a cushion material made of polyurethane foam packed in the seat cushion 12 of the seat 10. A concaved bearing portion (a first bracket) 16a and a concaved bearing portion (a first bracket) 17a which are fitted on the hollow shaft 40 are formed in a pair of left and right side frames 16, 17 of the cushion frame 15 at a rear end portion, respectively. In addition, bolt holes 16c, 17c are formed so as to penetrate, respectively, through flanges 16b, 17b which are formed at lower portions of the side frames 16, 17, respectively, in such a manner as to interpose the bearing portion 16a and the bearing portion 17b therebetween, respectively. The bolt holes 16c, 17c are formed so as to allow the pairs of stud bolts 41a, 41a to extend therethrough, respectively.

Consequently, the seat 10 is rotatably supported on the fixed shaft 36 by allowing the stud bolts 41a, 41a to extend through the bolt holes 16c, 17c so as to screw into nuts 41b and allowing the pair of side frames 16, 17 to be fixed to the hollow shaft 40 via the seat brackets 41, 41. To be specific, the pair of side frames 16, 17 are fixed to the hollow shaft 40 in such a manner that the concaved bearing portions 16a and 17a become substantially integral with the hollow shaft 40, whereby the seat 10 is rotatably supported on the fixed shaft 36 in such a manner that the rotational shaft 32 extends through the sides of the side frames 16, 17 at the rear portion thereof, namely, sides of the seat cushion 12 at a rear portion thereof.

With the seats 10, 20 being fixed to the hollow shafts 40, 42, respectively, as shown in FIG. 1, a relatively hard and flat plate-like carpet material 50 made up of a needle punched carpet etc., is fastened to a back side of the seat cushion 12, 22 with clips. As shown in the same figure, the carpet material 50 extends a predetermined dimension from the back side of the seat cushion 12, 22 to form an extension 54, and this extension 54 is constructed so as to rotate freely around a hinge portion 52 made up of a soft material. In addition, a thick portion 56 made of resin etc., is provided so as to extend along a distal end of the extension 54. Additionally, an operating handle 58 is provided on the carpet material 50 for use in rotating the seats 10, 40.

The operation of the vehicle seat apparatus that is constructed as has been described heretofore will be described below.

As has been described heretofore, the seat 10 and the seat 20 are constructed to be separate and independent from each other. Since the seat 10 is rotatably supported on the fixed shaft 36 via the hollow shaft 40 independently from the seat 20, whereas the seat 20 is rotatably supported on the fixed shaft 36 via the hollow shaft 42 independently from the seat 10, both the seat 10 and the seat 20 can be used simultaneously as the seat. Also, while being folded around the fulcrums 13, 23, both the seat 10 and the seat 20 are rotated backwards around the fixed shaft 36 toward the rear so that the seats can be stowed in the recessed portion 3 at the same time, or while one of the seat 10 and the seat 20 is being used as a seat, the other can be stowed in the recessed portion.

Referring to FIG. 4, a sectional view taken along the line A—A in FIG. 1 is shown or the seat unit 1 as viewed from the left-hand side is shown, the seat unit 1 being in a state in which the seat 10 is used as a seat, whereas the seat 20 is folded and stowed in the recessed portion 3. A description will be made below by reference to FIGS. 1 and 4.

In this case, since the seat 10 is used as a seat, a passenger H can normally be seated on the seat 10. The extension 54 of the carpet material 50 provided on the back side of the seat cushion 12 is folded at the hinge portion 52, as shown in FIG. 4, and the thick portion 56 disposed at the distal end of the extension 54 slides over the raised portion 2a to a position located at a rear end portion on the upper surface of the raised portion 2a.

On the other hand, since the seat 20 is folded and turned backwards to thereby be stowed in the recessed portion 3, the back side of the seat cushion 22 of the seat 20 is caused to face the inside of the passenger compartment. Since the rotational shaft 32 is constructed so as to extend through the rear portion of the sides of the side frames 16, 17 or through the rear portion of the sides of the seat cushion 22, even when the seat 20 is rotated backwards, there is no risk that the rotational shaft 32 protrudes into the passenger compartment, whereby there is formed a flat luggage space on the carpet material 50. In addition, the extension 54 of the carpet material 50 extends forwards on the raised portion 2a while allowing the thick portion 56 to slide forwards, whereby a gap 60 between the seat 20 and the raised portion 2a is covered with the carpet material 50. Thus, a wide and flat luggage space is formed on the carpet material 50. Consequently, even a large piece of luggage M can conveniently be loaded on the seat 20 side from a rear gate 62.

Namely, by using the seat 10 as a seat and rotating the seat 20 backwards for stowage in the recessed portion 3, the space at the rear of the passenger compartment of the vehicle can conveniently shared for use by the passenger H and the luggage M.

In addition, since the seat unit 1 is divided into the seat 10 and the seat 20, the mass of each of the divided seats 10, 20 becomes smaller than that of the seat unit 1, the rotating operation of the seats 10, 20 can be facilitated, whereby the working efficiency in stowing the seats 10, 20 can be improved.

In addition, since the seats 10, 20 are connected to the hollow shafts 40, 42 via the cushion frames 15, respectively, and rotate backwards for stowage when the hollow shafts 40, 42 rotate around the fixed shaft 36, the torsional rigidity and strength of the cushion frames 15 can be increased. Thus, a risk that the rotational center of the seat deviates between the brackets due to a torsional deformation of the cushion frame 15 is reduced when compared with, for example, a construction in which the seats 10, 20 are allowed to rotate around the fixed shaft 36 via a plurality of independent bearing brackets, whereby the hollow shafts 40, 42 are allowed to rotate around the fixed shaft 36 smoothly. Thus, the rotational operation of the seats 10, 20 is facilitated, and the working efficiency in stowing the seats 10, 20 is further increased.

Additionally, since the rotational shaft unit 30 is fixed to the floor panel 2 in such a manner as to straddle the recessed portion 3, no supporting post which supports the rotational shaft 32 needs to be provided at a central portion of the recessed portion 3. Therefore, when both of the seats 10, 20 is used as a seat, the recessed portion 3 can be used as a luggage compartment with nothing exists in the space of the recessed portion 3. This enhances the stowage of a piece of luggage therein.

Furthermore, since the rotational shaft unit 30 extends in the transverse direction to be fixed to the vehicle body, the strength of the body in the transverse direction is increased, and the strength of the vehicle can be increased further at the time of sideways collision. If the rotational shaft unit 30 extends further in the transverse direction to be fixed to the sides of the vehicle body, the rigidity of the vehicle can further be increased.

Moreover, since the concaved bearing portions 16a and 17a are provided integrally with the pair of side frames 16, 17, respectively, of the cushion frame 15, no separate mounting bracket needs to be provided on the side frames 16, 17. Therefore the structure can be simplified by the reduction in the number of components.

In addition, since the extension 54 of the carpet material 50 provided on the back side of the seat cushion 12 is constructed to be bent and folded from the hinge portion 52, a small piece of luggage (for example, a hazard warning reflective triangle) 64 stowed in the gap 60 between the seats 10, 20 and the raised portion 2a can easily be taken out of and returned into the gap 60 by pulling up the extension 54 when the seats 10, 20 are stowed in the recessed portion 3. Even when the seat 10 is not stowed in the recessed portion 3 so as to be used as a seat, in the event that the other seat 20 is stowed in the recessed portion 3, a gap 60 provided between the seat 20 so stowed and the front face of the recessed portion 3 can be used effectively.

Additionally, according to the embodiment, since a spare tire 70 is placed not in the inside but outside of the recessed portion 3, there should be caused no difficulty in taking out the spare tire 70 when the seats 10, 20 are stowed in the recessed portion 3, and the inconvenience that seats get dirty is prevented.

The invention is not limited to the thus described embodiment.

For example, while the example in which the third-row seat unit 1 is divided into two is described in the embodiment, the invention can also be applied conveniently to a case in which a seat unit 1 is divided into three or more.

In addition, while the seats 10, 20 are rotatably supported on the fixed shaft 36 via the hollow shafts 40, 42 in the embodiment, a construction may be adopted in which the seats 10, 20 are allowed to rotate around the fixed shaft 36 via a plurality of independent bearing brackets.

Additionally, while the seat brackets 41, 41 and the seat brackets 43, 43 are joined to the hollow shafts 40, 42, respectively, by way of welding in the embodiment, the seat brackets are not necessarily joined to the hollow shafts 40, 42.

Furthermore, while the nuts 41b are screwed on the stud bolts 41a, 41a and the stud bolts 43a, 43a provided on the seat brackets 41, 41 and the seat brackets 43, 43 in such a manner as to protrude therefrom, weld nuts may be provided on the flanges 16b, 17b at the lower portions of the side frames 16, 17 so that the bolts are made to screw into the weld nuts so provided.

As has been described heretofore, according to the vehicle seat apparatus of the invention, since the seat is divided into at least two and seats so divided are allowed to rotate around the rotational shaft independently, the divided seats of the seat can be individually stowed in the recessed portion. For example, the passenger can use one of the divided seats as a seat, while the other remaining seat is rotated backwards so as to be stowed in the recessed portion so that luggage can be loaded on the stowed seat, thereby making it possible to allow the space at the rear of the passenger compartment of the vehicle to be shared for use by the passenger and luggage.

In addition, since the divided seats are smaller in mass than the integral or one-piece seat, the working efficiency in stowing the seats can be improved.

What is claimed is:
1. A vehicle seat apparatus comprising:
  a seat disposed on a surface of a floor of a vehicle and including a seat cushion and a seat back;
  a rotational shaft; and
  a recessed portion formed in the surface of the floor at a position rearward of the seat,
  wherein the seat is rotatable around the rotational shaft towards a rear of the vehicle so that a bottom surface of the seat faces inside of a passenger compartment when the seat is stowed in the recessed portion,
  wherein the seat cushion and the seat back are both divided into at least two along a widthwise direction to form divided seats, and
  wherein each of the divided seats is mounted to the rotational shaft, and the seat cushions of the divided seats each have a cushion frame having a concave bearing portion with an opening for receiving the rotatable shaft, the concave bearing portion being recessed to fully seat the rotatable shaft, and a detachable bracket for closing the opening with the rotational shaft interposed therebetween, and wherein the rotational shaft extends through sides of the cushion frames of the seat cushions in a transverse direction.

2. A vehicle seat apparatus as set forth in claim 1, wherein the rotational shaft comprises:
   a first shaft fixed to a vehicle body at ends thereof; and
   at least two second shafts corresponding to the divided seats respectively mounted rotatably to the first shaft,
   wherein the divided seats are mounted to the corresponding second shafts respectively.

3. A vehicle seat apparatus as set forth in claim 2, further including a sleeve shorter than the second shaft interposed between the first shaft and each of the second shafts.

4. A vehicle seat apparatus as set forth in claim 2, wherein a spacer is interposed between the at least two second shafts.

5. A vehicle seat apparatus as set forth in claim 2, wherein each cushion frame includes a bracket, and the second shaft is interposed between the concave bearing portion and the bracket.

6. A vehicle seat apparatus as set forth in claim 2, wherein each seat cushion includes a pair of the cushion frames that support both end portions of the respective second shaft.

7. A vehicle seat apparatus as set forth in claim 2, wherein the first shaft is longer than a transverse length of the recessed portion and straddles the recessed portion to be fixed to the vehicle body.

8. A vehicle seat apparatus as set forth in claim 7, wherein the ends of the first shaft are fixed to sides of the vehicle body respectively.

9. A vehicle seat apparatus as set forth in claim 1, wherein a carpet material is disposed on a back side of the seat cushion, and the carpet material having an extension extending from the back side of the seat cushion to the front of the vehicle in a state in which the divided seat is stowed in the recessed portion.

10. A vehicle seat apparatus as set forth in claim 9, wherein a space is provided between the divided seat and a front face of the recessed portion in the state in which the seat is stowed, and the carpet material has a hinge portion extending in a widthwise direction of the divided seat so that the carpet material can be bent from the hinge portion.

11. A vehicle seat apparatus as set forth in claim 9, wherein an operating handle is provided on the carpet material for use in operating the divided seat.

12. A vehicle seat apparatus comprising:
   a seat disposed on a surface of a floor of a vehicle and including a seat cushion and a seat back;
   a first shaft having both ends thereof fixedly mounted to a vehicle body;
   at least two second shafts rotatably mounted to the first shaft;
   a spacer interposed between the two second shafts; and
   a recessed portion formed in the surface of the floor at a position rearward of the seat,
   wherein the seat is rotatable around the first shaft towards a rear of the vehicle so that a bottom surface of the seat faces inside of a passenger compartment when the seat is stowed in the recessed portion,
   wherein the seat cushion and the seat back are both divided into at least two along a widthwise direction to form divided seats,
   wherein each of the divided seats are mounted to one of the two second shafts so that the divided seats are each rotatably supported on the first shaft,
   wherein the seat cushions of the divided seats each have left and right side frames, and
   wherein both the left and right side frames of each at the seat cushions are mounted to the same one of the second shafts.

* * * * *